Nov. 25, 1930.    A. CHISLOCK    1,782,773
VEHICLE DIRECTION INDICATOR
Filed July 22, 1929
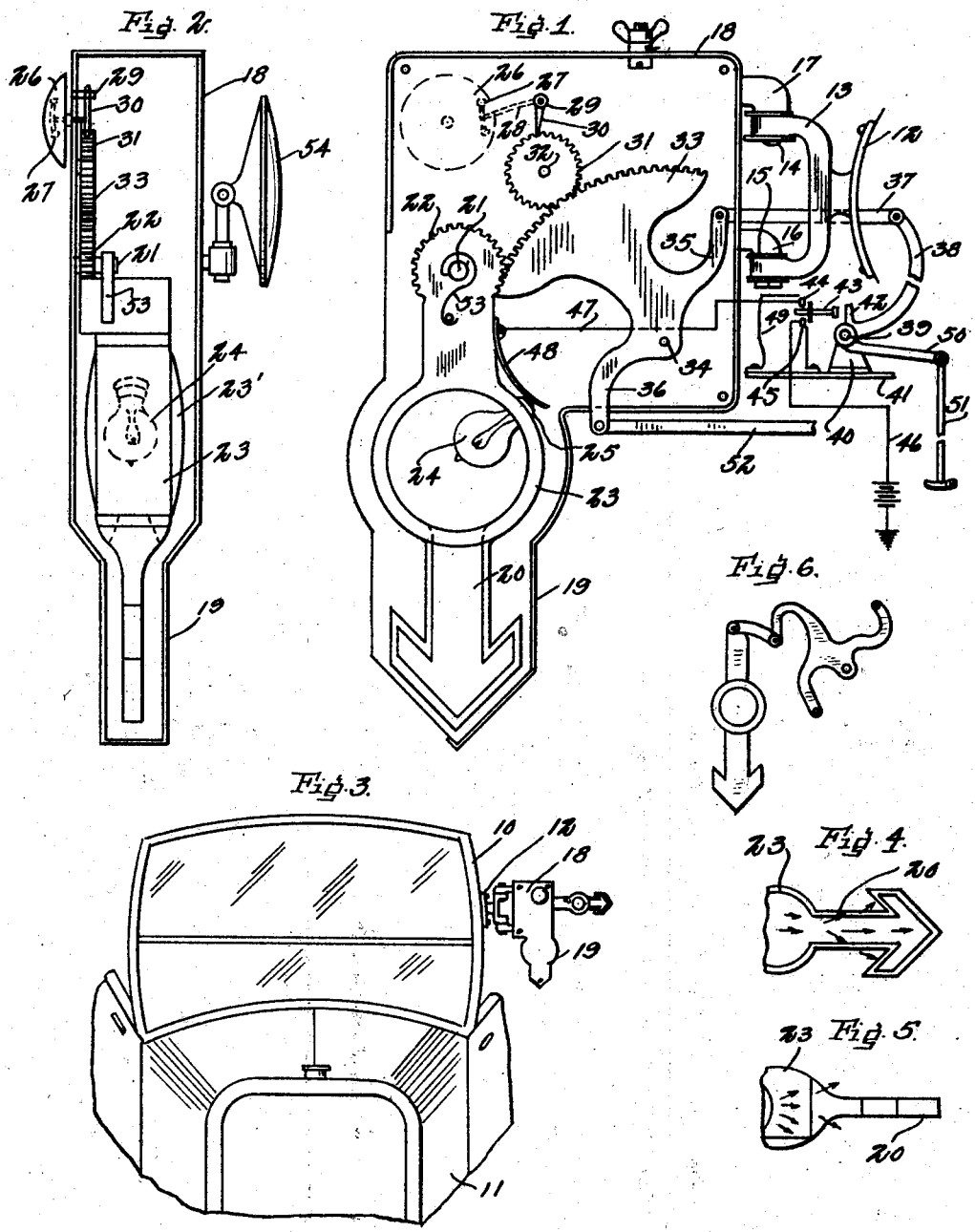
INVENTOR
Anthony Chislock Patented Nov. 25, 1930

1,782,773

UNITED STATES PATENT OFFICE

ANTHONY CHISLOCK, OF STAMFORD, CONNECTICUT

VEHICLE DIRECTION INDICATOR

Application filed July 22, 1929. Serial No. 379,946.

This invention relates to improvements in vehicle direction indicators, and it is the principal object of my invention to provide an indicator which indicates visibly as well as acoustically the intention of the operator to make a turn or to come to a stop.

Another object of my invention is the provision of a vehicle direction indicator which is mechanically operated, and simultaneously electrically illuminated, while the ringing of a bell announces an intended change in the operation of the vehicle.

A further object of my invention is the provision of a vehicle direction indicator of comparatively simple construction, yet durable and efficient in operation.

These and other objects and advantages of my invention will become more fully apparent as the description thereof proceeds, and will then be specifically defined in the appended claims.

In the accompanying drawing forming a material part of this disclosure:

Fig. 1 is a front elevation of a vehicle direction indicator constructed according to my invention.

Fig. 2 is an end elevation thereof.

Fig. 3 is a front end elevation of an automobile equipped with an indicator according to my invention.

Fig. 4 is a fragmentary side elevation of an illuminated arrow used with my direction indicator.

Fig. 5 is a top plan view thereof.

Fig. 6 shows a modified form of indicating means.

As illustrated, to the windshield frame 10 of a car 11 of any desired, conventional type, the base plate 12 of a bracket 13 is secured, the outwardly directed arms of which are equipped with suitable bearings 14, 15, for the reception of hooks 16, 17 integrally made with a casing 18 having a downwardly directed extension 19.

An arrow 20 is pivotally attached, near its upper end as at 21 to a pin in casing 18, and has its extreme upper rounded end provided with teeth 22, while intermediate its ends a circular casing 23 is formed, the front and rear wall of which are formed by a transparent material 23' of a suitable color, adapted to be illuminated by a lamp 24 in a socket 25.

On the front face of casing 18 a bell 26 is arranged, the clapper 27 of which is connected by means of an arm 28 of a bell-crank lever fulcrumed at 29, to the other arm 30 of said lever which is arranged within the casing and engages with its lower pointed end between the teeth of a gear 31 on a pin 32 within casing 18. Gear 31 meshes with a toothed segment 33 pivoted as at 34 in casing 18 and in mesh with the toothed end 22 of arrow 20.

The segment piece 33 has formed at its lower end an upwardly directed, curved arm 35, and a downwardly directed lower arm 36.

To the end of the upper arm one end of a link 37 is pivotally secured, to the other end of which one end of a curved lever 38 is attached, the other end of which is pivoted, as at 39, to a lug 40 on a bracket 41 on the automobile.

The lever 38 has at its lower end, an operating finger 42 for operating a circuit closing member 43 adapted to close the circuit over contacts 44 and 45, the lower of which, 45 is connected by wire 46 to one terminal of the vehicle battery, the other terminal of which is grounded, while the upper contact 44 is connected by wire 47 with a contact leaf spring 48 engaging the lamp socket 25, and by wire 49 with the light circuit of the car.

Lever 38 is operated by a link 50 adapted to be operated by means of a hand operated lever 51, adapted to be pushed upwardly for allowing an operation of the segment to swing arrow 20 outwardly while a pull on lever 52 allows a carrying of segment 33 and its co-operating parts back into their normal position after each operation, assisted by spring 53 wound at one end about pin 21 while its opposite end is secured to a pin in arrow 20, as shown in Figure 1.

A spotlight 54 of any suitable type may be combined with the casing 18.

The operation of my invention will be entirely clear from the above description and the drawing and it will be evident that upon operation of the segment 33 by means of levers 51 and 52 through the intermediary of the levers and links, the arrow will be swung out to extend laterally from the casing while it is simultaneously illuminated by the closing of a light circuit by member 43, connecting contacts 44 and 45. The operation of the segment to swing out the arrow arm will simultaneously also operate the clapper 27 of bell 26 and in this manner will acoustically announce an intended turn etc.

It will be understood that I have disclosed one of the possible many forms of practical construction of my device and that I may make such changes therein as come within the scope of the appended claims without departure from my invention.

Having thus described my invention, what I claim as new and desire to secure by Letters Patent is:

1. Vehicle direction signal comprising a casing adapted to be attached to a vehicle, an extension for said casing, a signal arm in shape of an arrow having transparent side walls pivotally arranged in said casing, a lamp in said arm, a plurality of teeth formed at the upper rounded end of said arm near its pivot point, a toothed segment movably arranged in said casing in mesh with the teeth on said arm, an acoustic signal, means for operating said signal upon the operation of said segment, mechanically operated means for operating said segment from the driver's seat, and a means for returning said arm into its normal position of rest after each operation.

2. In a vehicle signal, a casing, means for attaching said casing to the vehicle, a toothed segment pivotally secured at its lower end in said casing, two oppositely extending arms formed with said segment, means engaged by said segment to operate an indicator arm, and an acoustic signal, and mechanically operated means attached to the arms of said segment to operate the same for swinging said indicator arm laterally out of the casing and for sounding said acoustic signal, and a means for returning said signal arm into its normal position of rest within the casing.

3. In a vehicle direction indicator, a casing adapted to be attached to the windshield of the vehicle, a downwardly directed extension on said casing, a signal arm having substantially the shape of an arrow pivotally attached near one of its ends in said casing, a toothed upper end on said arm, a toothed segment pivoted in said casing, in mesh with the teeth of the upper end of said arm, an acoustic signal, a gear in mesh with said toothed segment, a clapper for said acoustic signal, means for connecting said gear with said clapper to sound the signal upon the operation of said arm, a manually operated lever, and means connecting said lever with said segment to operate the same for sounding the acoustic signal and for laterally swinging said arm out of its casing to indicate an intended turn.

4. In a vehicle direction signal, a signal arm having substantially the shape of an arrow, a median part of said arm forming a glass casing, a lamp therein, a casing for said arm in which the same is pivotally held, a bell, a means in the signal arm casing for simultaneously swinging said arm into its signaling position and sounding said bell, a hand lever, a means for connecting said hand lever to said signal operating means, and a spring for returning said arm into its normal position of rest after each operation.

5. In a vehicle direction signal, a signal arm, a toothed inner end on said arm, a means for operating said arm comprising a toothed segment in mesh with said toothed inner end of the signal arm, an upwardly directed arm at one end of said segment and a downwardly directed arm at the other end of said segment, a link pivoted to said upwardly directed arm, a curved lever attached to said link, means for allowing a manually pushing of said curved lever upwardly to swing the signal arm into its signaling position, and a manually operated lever pivoted to said downwardly directed arm for allowing a carrying of said signal arm into its position of rest, a gear in mesh with said segment, a bell crank lever engaging said gear with one of its arms, a bell, and a clapper attached to the other end of said bell-crank lever to ring the bell upon the swinging of said signal arm into signaling position Signed at Stamford, in the county of Fairfield and State of Connecticut, this 24th day of June, A. D. 1929.

ANTHONY CHISLOCK.